United States Patent [19]
Sensney

[11] Patent Number: 5,390,240
[45] Date of Patent: Feb. 14, 1995

[54] DATA DIAL SYSTEM AND METHOD

[75] Inventor: Cleatus R. Sensney, Tulsa, Okla.

[73] Assignee: Williams Telecommunications Group, Inc., Tulsa, Okla.

[21] Appl. No.: 957,939

[22] Filed: Oct. 8, 1992

[51] Int. Cl.$^6$ .......................................... H04M 11/00
[52] U.S. Cl. ...................................... 379/94; 379/97; 379/96; 379/171; 379/172; 379/173
[58] Field of Search ...................... 379/94, 97, 96, 95, 379/93, 98, 102, 104, 105, 54, 53, 85, 202, 203, 204, 205, 206, 173, 172, 171, 165, 88

[56] References Cited

U.S. PATENT DOCUMENTS

| | | | |
|---|---|---|---|
| 3,189,687 | 6/1965 | Miller | 379/93 |
| 3,692,946 | 9/1972 | Budrys et al. | 379/196 |
| 3,920,926 | 11/1975 | Lenaerts et al. | 379/93 |
| 3,975,595 | 8/1976 | Berube et al. | 379/216 |
| 3,987,247 | 10/1976 | Fizer | 379/94 |
| 4,191,860 | 3/1980 | Weber | 379/115 |
| 4,427,848 | 1/1984 | Tsakanikas | 379/97 |
| 4,645,872 | 2/1987 | Pressman et al. | 379/54 |
| 4,677,659 | 6/1987 | Dargan | 379/97 |
| 4,716,583 | 12/1987 | Groner et al. | 379/88 |
| 4,829,559 | 5/1989 | Izawa et al. | 379/96 |
| 4,870,677 | 9/1989 | DiSanto et al. | 379/96 |
| 4,937,856 | 6/1990 | Natarajan | 379/205 |
| 4,969,184 | 11/1990 | Gordon et al. | 379/100 |
| 4,987,588 | 1/1991 | Fukuma et al. | 379/98 |
| 5,016,270 | 5/1991 | Katz | 379/92 |
| 5,031,206 | 7/1991 | Riskin | 379/97 |
| 5,099,510 | 3/1992 | Blinken, Jr. et al. | 379/202 |

*Primary Examiner*—Curtis Kuntz
*Assistant Examiner*—Stella V. Woo
*Attorney, Agent, or Firm*—David Newman & Associates

[57] ABSTRACT

A data dial system having at least one matrix switch, one or more user terminals, one or more Touch-Tone push button telephones, and at least one processor. The matrix switch can switch the user terminals between various inputs and outputs. The Touch-Tone push button telephones, each of which has a dual-tone-multiple-frequency keypad, generates signals which can actuate the processor. The processor controls the operation of the matrix switch, for switching signals between signal sources and signal destinations by establishing connections and by performing disconnections of the various inputs and outputs of the matrix switch.

61 Claims, 7 Drawing Sheets

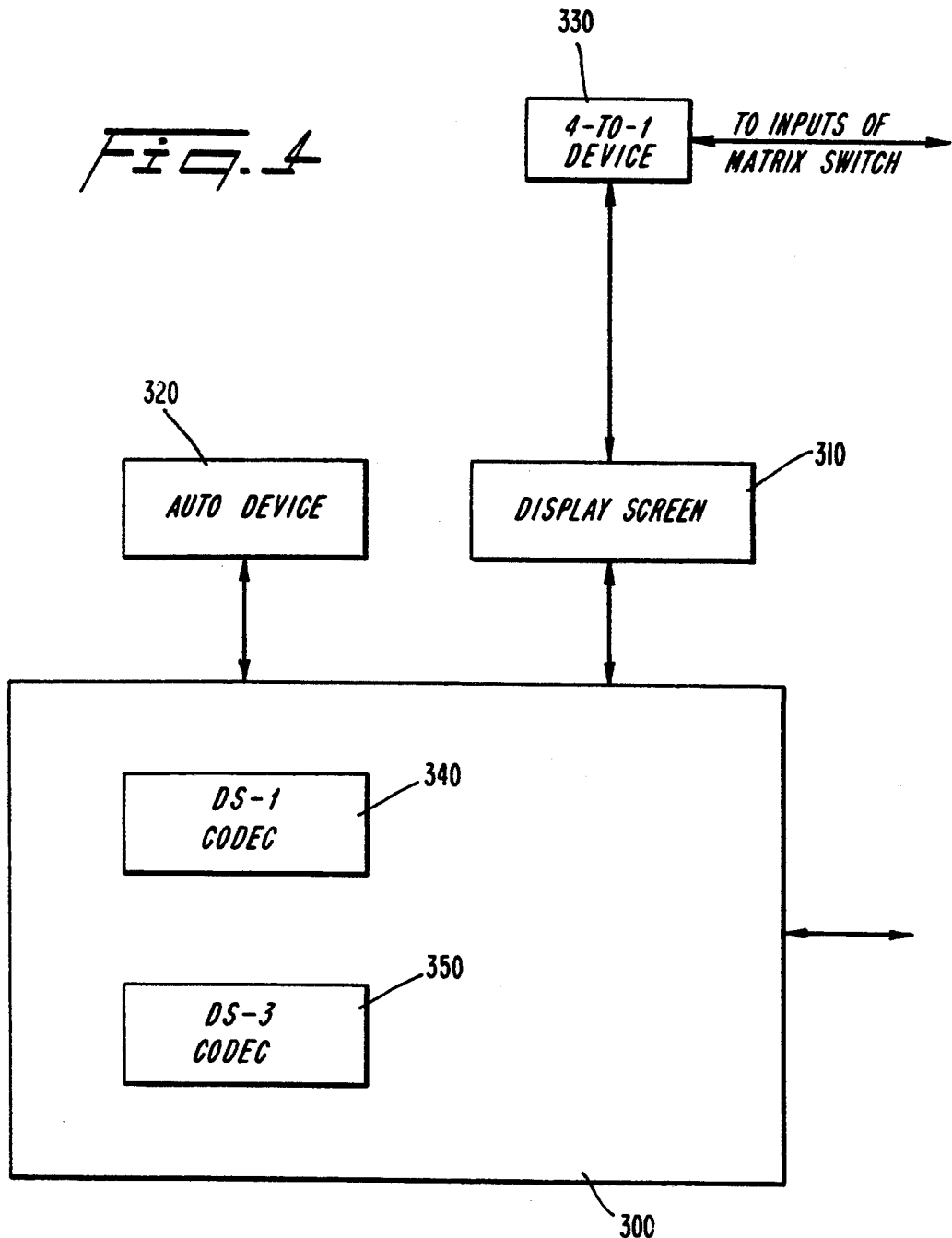

Fig. 5 — 190

DATA DIAL MAIN MENU PROGRAM

OPTIONS:

1. ON-LINE HELP
2. DATA-DIAL PC CONTROL PROGRAM
3. CONFIGURE OR RECONFIGURE A MATRIX SWITCH
4. ACCOUNT ID & PASSWORD: SET-UP & MAINTENANCE
5. DIRECTLY CONTROL A MATRIX SWITCH
6. CHECK STATUS OF A MATRIX SWITCH
7. DEFINE PRESET CONNECTIONS
8. ASSIGN ROOM NUMBERS TO MATRIX SWITCH PORTS
9. EXIT THIS PROGRAM

PLEASE ENTER OPTION NUMBER —

Fig. 6 — 191

ACCOUNT ID AND PASSWORD PROGRAM

THE CURRENT MASTER PASSWORD MUST BE ENTERED TO ACCESS THIS PROGRAM.

PLEASE ENTER THE MASTER PASSWORD:

Fig.7

THANK YOU

PLEASE ENTER THE NUMBER OF THE FUNCTION THAT YOU WOULD LIKE TO PERFORM:

1. CHANGE MASTER PASSWORD
2. ADD ACCOUNT ID'S AND PASSWORDS
3. CHANGE PASSWORDS ON EXITING ACCOUNT ID'S
4. EXIT

ENTER YOUR CHOICE -

1. PRESET CONFERENCE
2. CONFERENCE CONNECTION
3. TIMED RESERVATION
4. FOUR-WAY
5. DISCONNECT
6. RETURN TO MAIN MENU

Fig.8

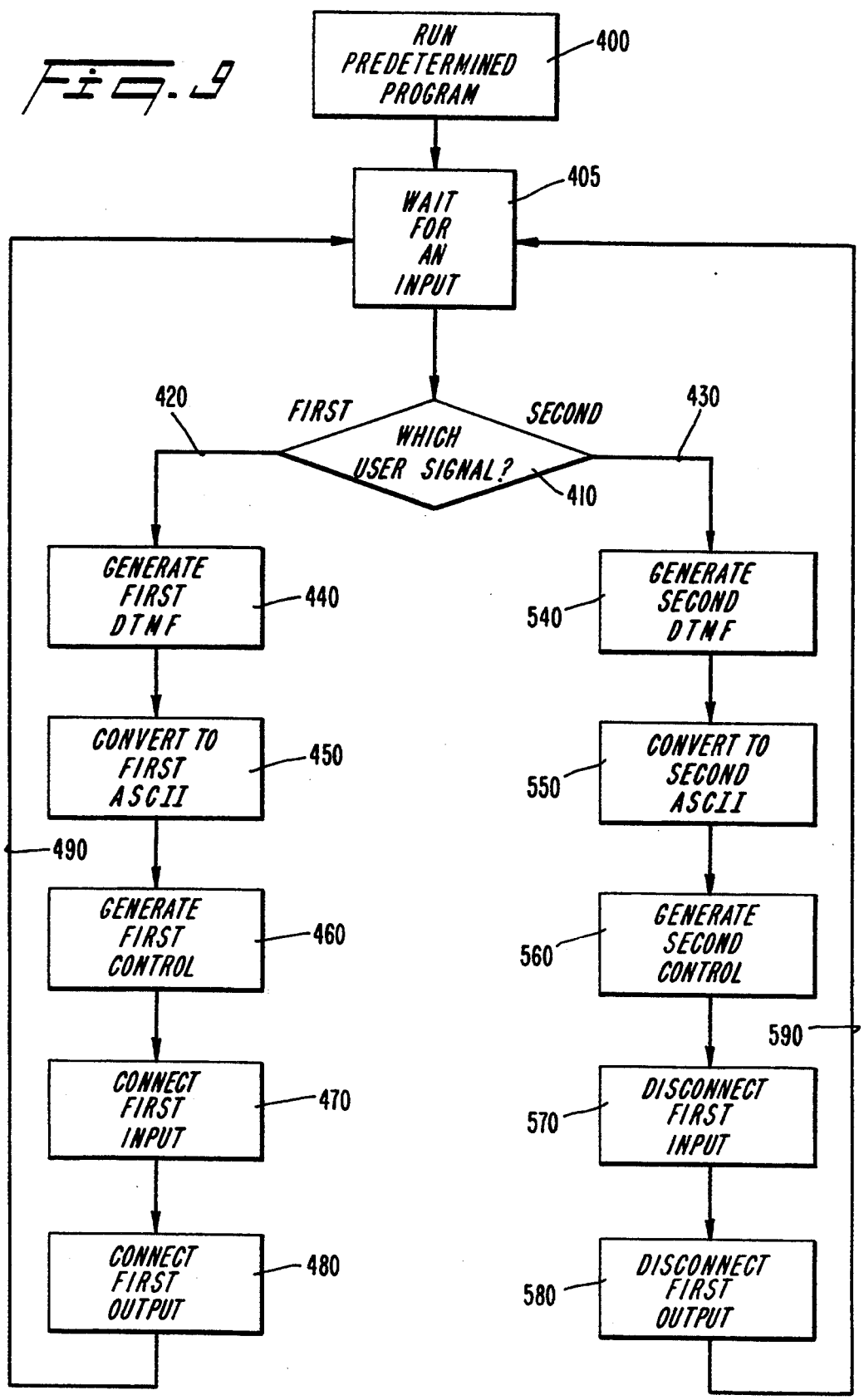

DATA DIAL SYSTEM AND METHOD

BACKGROUND OF THE INVENTION

This invention relates a data dial system and method for a matrix switch and more particularly to a matrix switch using a computer activated Touch-Tone push button telephone signal.

DESCRIPTION OF THE RELEVANT ART

In the prior art, U.S. Pat. No. 4,427,848 to Tsakanikas teaches a telephonic alphanumeric data transmission system which allows communication between a telephone set and a remote site. Communication is established by generating appropriate interconnection command signals to the telephone system, e.g. keying the assigned telephone number of the remote site into the telephone system using a telephone set keypad. The system allows the dual-tone-multiple-frequency signals of a Touch-Tone push button telephone to be read by and controlled by a computer.

U.S. Pat. No. 4,677,659 to Dargan relates to a telephonic data access and transmission system. A Touch-Tone push button telephone is used at a remote station coupled through telephone lines or the like. A host station is connected to the remote station through the telephone lines and includes a computer or other data processing apparatus and a Touch-Tone push button decoder for receiving the dual-tone-multiple-frequency signals from the remote station, and generates a corresponding data stream that is readable by the computer. The system disclosed in Dargan is based on the use of standard Touch-Tone push button keypads where letters are transmitted by pressing one key for the letter desired.

The prior art does not provide a data dial system which allows a number of terminals, each terminal being collocated with a Touch-Tone push button telephone, to communicate via the matrix switch and, at the same time, to have the Touch-Tone push button telephones control the routing of the signals through the matrix switch.

OBJECTS OF THE INVENTION

A general object of the invention is a data dial system and method which allows a Touch-Tone push button telephone to control the routing of information and video signals through a matrix switch.

Another object of the invention is a data dial system and method which allows remote terminals to be located at a long distance, such as 200 feet, from the matrix switch, while still allowing the remote terminals to communicate through the matrix switch.

An additional object of the invention is a data dial system and method which allows a Touch-Tone push button telephone to control access of signals from diverse sources through a matrix switch.

Another object of the invention is a data dial system and method providing a computer-driven system using menus and synthesized voice instructions to assist in the control and access of signals from diverse sources.

A further object of the invention is a data dial system and method which is easy to implement and use.

SUMMARY OF THE INVENTION

According to the present invention, as embodied and broadly described herein, a data dial system and method is provided for use with at least one user terminal to route signals from a source to a destination in the data dial system. The system and method includes switching means, Touch-Tone push button means, converting means, and processing means. The switching means includes at least one matrix switch, the Touch-Tone push button means includes at least one Touch-Tone push button telephone collocated with the user terminal, the converting means includes at least one dual-tone-multiple-frequency to ASCII converter, and the processing means includes at least one processor. The matrix switch has a first plurality of inputs, a first plurality of outputs, a second plurality of inputs, and a second plurality of outputs. The first plurality of inputs and the first plurality of outputs are switchable between each other, and the second plurality of inputs and the second plurality of outputs are switchable between each other. More particularly, in response to a first control signal, a first input of the first plurality of inputs connects to at least one of the first plurality of outputs of the matrix switch.

Similarly, in response to the first control signal, a first output of the second plurality of outputs connects to one of the second plurality of inputs of the matrix switch. In response to a second control signal, the matrix switch disconnects the first input from the connected one of the first plurality of outputs of the matrix switch, and the first output from the connected one of the second plurality of inputs of the matrix switch. The connecting of inputs and outputs is performed internal to each of the matrix switches and is controlled by the externally provided control signals.

Each of the user terminals is operatively coupled to one of the first plurality of inputs and to one of the second plurality of outputs. Each of the Touch-Tone push button telephones is collocated with a respective one of the user terminals, and each of the Touch-Tone push button telephones is operatively coupled to a respective at least one dual-tone-multiple-frequency to ASCII (DTMF-ASCII) converter for generating ASCII signals. In response to each DTMF signal, each of the DTMF-ASCII converters converts each DTMF signal to an ASCII signal corresponding to a DTMF signal from a Touch-Tone push button telephone, to allow a caller to use the telephone to communicate with the processor, such as a computer, which controls the matrix switch.

Each of the processors is operatively coupled to a respective one of the DTMF-ASCII converters. In response to each ASCII signal received by at least one processor, the processor generates the first control signal for connecting the first input of the first plurality of inputs to at least one of the first plurality of outputs of the matrix switch, and for connecting the first output of the second plurality of outputs to one of the second plurality of inputs of the matrix switch. The processor generates the second control signal for disconnecting the first input and the first output of the matrix switch.

The present invention also includes a method, using a data dial system, for routing signals within the data dial system, including the steps of running a predetermined program; waiting for a caller to input a user signal; determining if the caller input a first user signal or a second user signal on a Touch-Tone push button keypad from a Touch-Tone push button telephone; executing, in response to an input of a first user signal, a connection sequence; otherwise, executing, in response to an input of a second user signal, a disconnection sequence; generating, in response to the first user signal, a first dual-tone-multiple-frequency (DTMF) signal from the first user signal; converting, in response to the first DTMF signal, the first DTMF signal to a first ASCII signal; generating, in response to the first ASCII signal, a first control signal; connecting, in response to the first control signal, a first input of a first plurality of inputs of the matrix switch to at least one of a first plurality of outputs; connecting, in response to the first control signal, a first output of a second plurality of outputs of the matrix switch to at least one of the second plurality of inputs; and returning to waiting for the caller to input a first user signal or a second user signal.

The method further includes the steps of generating, in response to the second user signal, a second dual-tone-multiple-frequency (DTMF) signal from the second user signal; converting, in response to the second DTMF signal, the second DTMF signal to a second ASCII signal; generating, in response to the second ASCII signal, a second control signal; disconnecting, in response to the second control signal, the first input of the matrix switch from one or more of a first plurality of outputs; disconnecting, in response to the second control signal, the first output of the matrix switch to one or more of the second plurality of inputs; and returning from waiting for the caller to input a first user signal or a second user signal.

Additional objects and advantages of the invention are set forth in part in the description which follows, and in part are obvious from the description, or may be learned by practice of the invention. The objects and advantages of the invention also may be realized and attained by means of the instrumentalities and combinations particularly pointed out in the appended claims.

BRIEF DESCRIPTION OF THE DRAWINGS

The accompanying drawings, which are incorporated in and constitute a part of the specification, illustrate preferred embodiments of the invention, and together with the description serve to explain the principles of the invention.

FIG. 4 illustrates a user terminal;

FIG. 5 illustrates a main menu of a computer program;

FIG. 6 illustrates a password prompt;

FIG. 7 illustrates a password maintenance menu;

FIG. 8 illustrates a connection and disconnection menu; and

FIG. 9 illustrates a flowchart of the method of the present invention.

DETAILED DESCRIPTION OF THE PREFERRED EMBODIMENTS

Figure 1:
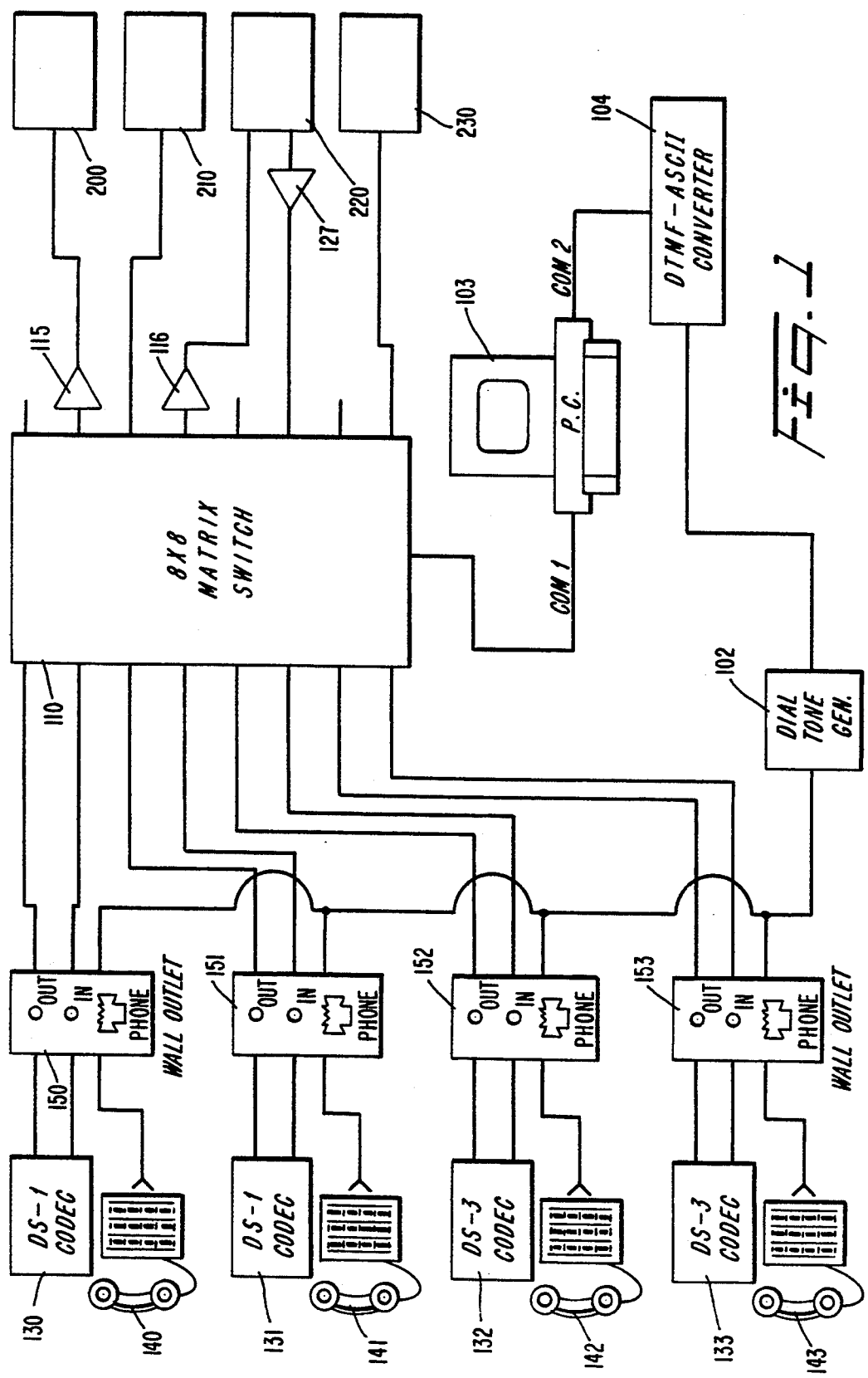
FIG. 1 illustrates a data dial system using a single computer with a single matrix switch.

Reference is now made in detail to the present preferred embodiments of the invention, examples of which are illustrated in the accompanying drawings, wherein like reference numerals indicate like elements throughout the several views.

In the exemplary arrangement shown in FIG. 1, a data dial system is shown including at least one user terminal, switching means, Touch-Tone push button means, converting means, and processing means. The switching means is embodied as a matrix switch 110, the Touch-Tone push button means is embodied as one or more Touch-Tone push button telephone 140, 141, 142, 143, the converting means is embodied as a dual-tone-multiple-frequency to ASCII (DTMF-ASCII) converter 104, and the processing means is embodied as a computer 103 using at least one microprocessor.

The matrix switch 110 has a first plurality of inputs, a first plurality of outputs, a second plurality of inputs, and a second plurality of outputs. The first plurality of inputs and the first plurality of outputs are switchable between each other, and the second plurality of inputs and the second plurality of outputs are switchable between each other. In response to a first control signal, a first input of the first plurality of inputs connects to at least one of the first plurality of outputs. Similarly, in response to the first control signal, a first output of the second plurality of outputs connects to one of the second plurality of inputs. Also, in response to a second control signal, the matrix switch 110 disconnects the first input from the connected one of the first plurality of outputs, and disconnects the first output from the connected one of the second plurality of inputs. The connecting and disconnecting of various inputs and outputs is performed internal to the matrix switch 110 and is controlled by the externally supplied first control signal and second control signal, respectively.

The first control signal includes the appropriate coding or signalling for directing the matrix switch 110 to connect an appropriate first input to a desired one of the first plurality of outputs, and an appropriate first output to the desired one of the second plurality of inputs. The second control signal includes the appropriate coding or signalling for directing the matrix switch 110 to disconnect an appropriate first input and first output. Each of the user terminals 130, 131, 132, 133 may include a DS-1 coder/decoder (codec) or a DS-3 codec, or a combination of DS-1 and DS-3 codecs. For example, as shown in FIG. 4, a user terminal 300 may include a DS-1 codec 340 and/or a DS-3 codec 350. Other types of user terminals may be used, as is well known in the art.

Referring to FIG. 1, each of the user terminals 130, 131, 132, 133 is operatively coupled through a first cable to one of the first plurality of inputs and through a second cable to one of the second plurality of outputs of the matrix switch 110. The first and second cables typically are coaxial cables for allowing broadband or high speed data to pass therethrough. As shown in FIG. 1, the connections may be made by coupling the first and second cable to the first plurality of inputs and the second plurality of outputs, respectively, through wall outlets 150, 151, 152, 153.

Each of the Touch-Tone push button telephones 140, 141, 142, 143 includes a telephone handset and a Touch-Tone push button keypad, and each of the Touch-Tone push button telephones 140, 141, 142, 143 typically is located near each of the user terminals 130, 131, 132, 133, respectively. The preferred embodiment further includes a generating means, embodied as a dial tone generator 102, which is coupled, through at least one wall outlet 150, 151, 152, 153, to a respective one of the Touch-Tone push button telephones 140, 141, 142, 143. The dial-tone generator 102 provides the necessary direct current biasing level for operating the Touch-Tone push button telephones 140, 141, 142, 143. The DTMF-ASCII converter 104 is connected between the dial tone generator 102 and the computer 103, which may be a personal computer. In response to a DTMF signal from one of the Touch-Tone push button telephones 140, 141, 142, 143, the DTMF-ASCII converter 104 converts the DTMF signal to an ASCII signal.

The computer 103 is operatively coupled to the DTMF-ASCII converter 104. The DTMF-ASCII converter 104 may be located within the computer 103 or external to the computer 103. In response to an ASCII signal received from the DTMF-ASCII converter 104, the computer 103, running a predetermined program, generates a first control signal for connecting a first input of the first plurality of inputs to at least one of the first plurality of outputs of the matrix switch 110. The first control signal can also cause a first output of the second plurality of outputs to connect to one of the second plurality of inputs. In addition, in response to the appropriate ASCII signal, the computer 103 generates the second control signal for disconnecting the first input of the second plurality of outputs and the second output.

As shown in FIG. 1, each matrix switch 110 may be connected to a DTMF-ASCII converter 104 through a computer 103. Couplings are provided for connecting the inputs and outputs of each matrix switch 110 to, for example, a gateway 200 to a local area network (LAN), to a DS-1 codec 210, to a DS-3 codec 230, and to a second matrix switch 220.

In use, the data dial system uses the matrix switch 110 to switch DS-1 signals, DS-3 signals, T1 signals, T3 signals, audio signals, video signals, and television signals within a large building or between buildings, and for sending such signals from any wall outlet to another wall outlet, under the control of the telephones in the data dial system. For example, a first caller, as a source, can dial on the Touch-Tone push button telephone keypad, a particular destination to which the first caller wishes to communicate. Each user terminal, by way of example, may have an identification number. The first caller can dial the Touch-Tone push button keypad with a destination caller's identification number to route the caller's video signals through the matrix switch 110 to the destination user terminal. The first caller may actuate one or more DTMF signals by pushing the appropriate push buttons on the Touch-Tone push button keypad. The one or more DTMF signals are converted to one or more ASCII signals, respectively, using the DTMF-ASCII converter 104. Using the predetermined program, the computer 103 is programmed to respond to the one or more ASCII signals and to generate the first control signal. The first control signal actuates the matrix switch 110. Accordingly, the matrix switch 110 can be controlled from a standard telephone, through the DTMF-ASCII converter 104 and computer 103 via a modem. This allows switching to be done by any caller with the proper identification codes.

The actual switching of the matrix switch 110 is done by connecting and disconnecting sources and destinations. A source can be connected to more than one destination; however, a destination typically can only be connected to one source. In the preferred embodiment, an 8×8 matrix switch 110 is used, providing a total of eight connections which may be established within any one matrix switch 110, but matrix switches of different dimensions and connections may alternately be employed in a similar manner. The 8×8 matrix switch 110 allows additional matrix switches to be connected to the 8×8 matrix switch 110, and each additional matrix switch may further be connected to other matrix switches.

In addition, combiner devices may be included, allowing for multiple video signals to be combined as a combined signal for output as multiple images on a screen. For example, as illustrated in FIG. 4, a four-to-one device 330 may accept four signals from the matrix switch 110. The inputted four signals pass through the four-to-one device, in which the four signals are combined and output as a combined signal. The combined signal may then be projected as four pictures or images on one display screen 310 coupled to the four-to-one device 330.

Figure 2:
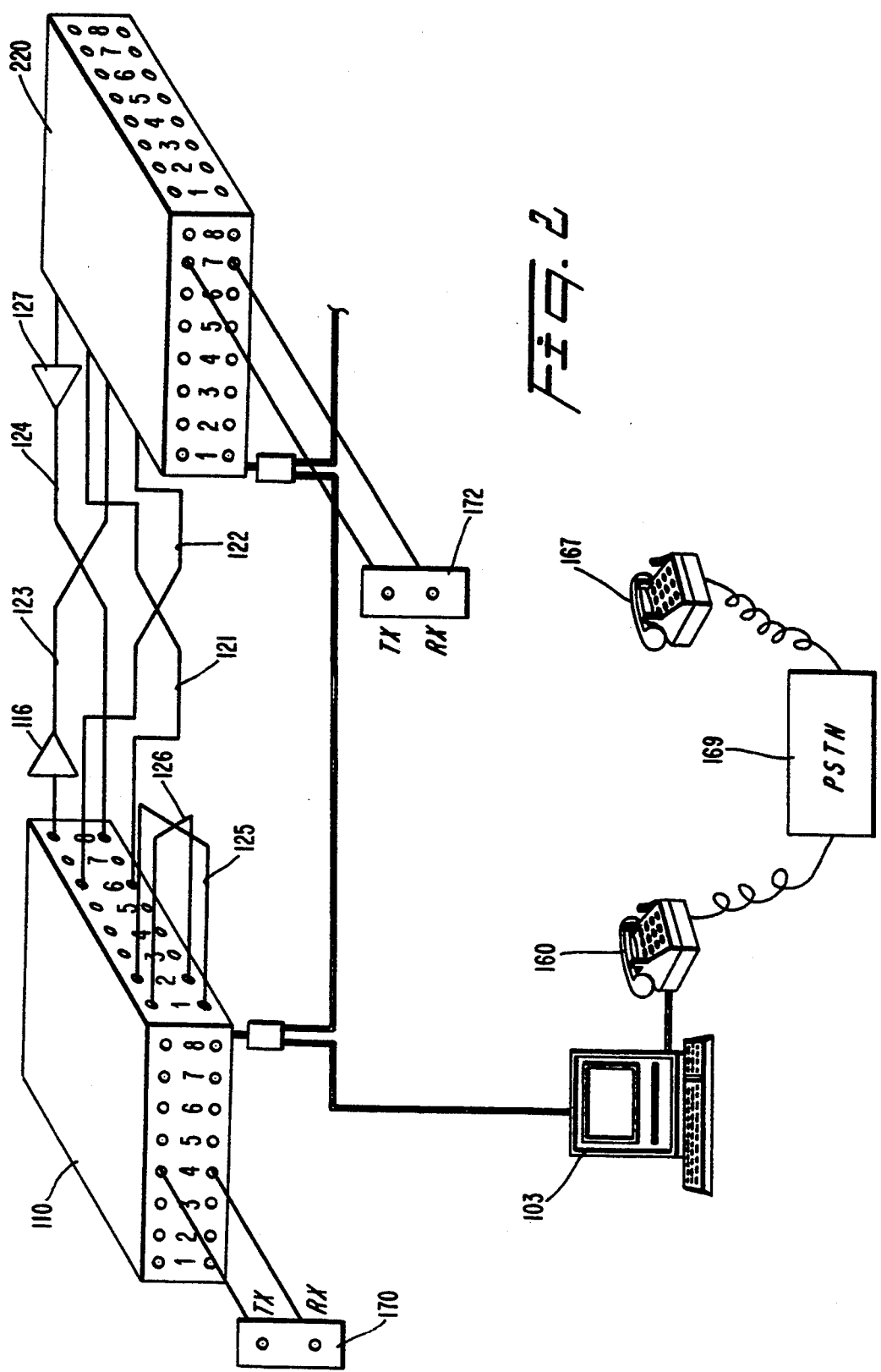
FIG. 2 illustrates a data dial system having two matrix switches.

In an alternate embodiment, illustrated in FIG. 2, a data dial system includes at least two matrix switches 110, 220 connected together, with each being separately addressable from the computer 103. For the embodiment shown in FIG. 2, the first control signal and second control signal each have the appropriate address codes for actuating the appropriate matrix switch or plurality of matrix switches. In addition, as shown in FIG. 2, the telephone 160 may be connected to at least one other telephone 167 through a public switched telephone network (PSTN) 169, allowing the at least one other telephone 167 to access the data dial system through the PSTN and through the computer 103. Other devices, such as computers and private branch exchanges (PBX's), may access the data dial system through the PSTN. In the embodiment of FIG. 2, the use of a PSTN obviates the need for a dial tone generator.

Such couplings between Touch-Tone push button telephones, user terminals, and computers may comprise coaxial cables. The couplings between matrix switches may comprise coaxial cables 121, 122, as shown in FIG. 2, while, for long distances, the couplings may include trunk lines 123, 124. The couplings may connect to the inputs and outputs of the matrix switches 110, 220 through pre-installed wall connectors or wall plates 170, 172. As illustrated in FIG. 2, the trunk lines 123, 124, as well as other trunk lines from the outputs of the matrix switches, may optionally include a plurality of amplifiers, embodied as line build out (LBO) cards 116, 127. The LBO cards equalize the effects of frequency lag, as such LBO amplifiers are data rate sensitive. The LBO cards 116, 127 are included in the couplings, preferably for long distance trunk connections between matrix switches 110, 220 and for long distance trunk connections to other devices, such as gateways to LAN's and DS-1 and DS-3 codecs, since long distance transmissions are limited to a bandwidth of the amplifiers of the long distance trunk connections.

The plurality of amplifiers, embodied as LBO cards 116, 127, are connected to, and are located near, the first plurality of outputs and the second plurality of outputs for amplifying the signals at the output of the matrix switches 110, 220. Each of the plurality of amplifiers 116, 127 is connected to a respective one of the first plurality of outputs and the second plurality of outputs of the matrix switches 110, 220. In order for proper gain and amplification of signals between the matrix switches 110, 220 and a far end of a cable connected to one of the outputs, each of the plurality of amplifiers 116, 127 preferably is connected at or near each of the first plurality of outputs and each of the second plurality of outputs, respectively. Each of the plurality of amplifiers 116, 127 provides sufficient gain for signals at each of the plurality of outputs to have a useable signal strength level at an end of, for example, a 200 foot cable. In addition, couplings 125, 126 may also be included to reroute inputs and outputs through the matrix switches 110, 220.

Figure 3:
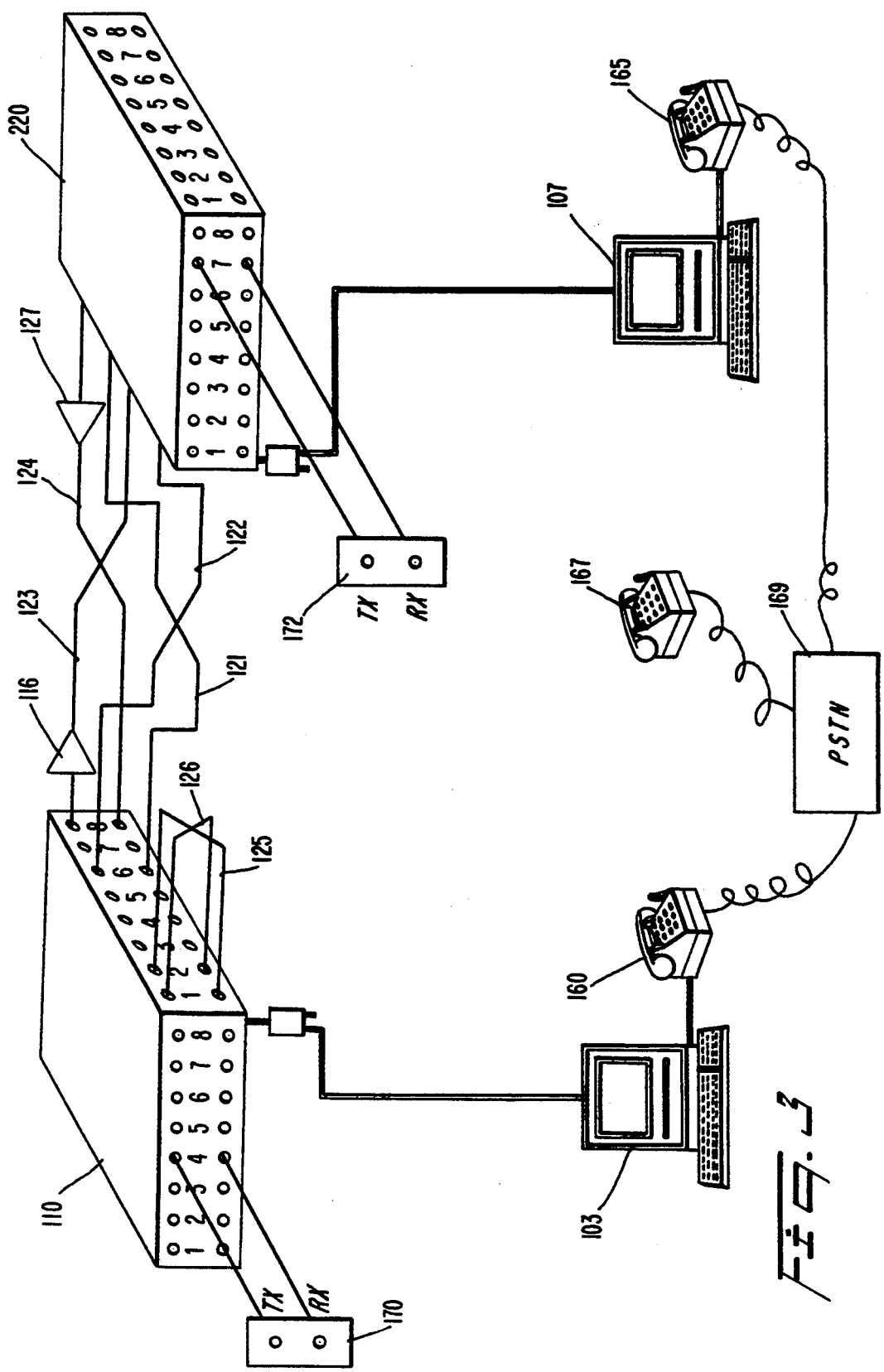
FIG. 3 illustrates an alternate embodiment of a data dial system having two matrix switches.

In a further embodiment, illustratively shown in FIG. 3, the data dial system has two matrix switches 110, 220 connected together, with each being separately addressable from computers 103, 107, respectively, and with computers 103, 107 accessed by telephones 160, 165, respectively. Telephones 160, 165 may be connected to at least one other telephone 167 through a public switched telephone network (PSTN) 169, allowing the at least one other telephone 167 to access the data dial system through the PSTN and through the computers 103, 107. In the embodiment of FIG. 3, the use of the PSTN obviates the need for a dial tone generator.

The data dial system can be used with a Northern Telecom PBX system communicating with either of the DTMF-ASCII converters connected to matrix switches 110, 220, respectively. The telephone number for either of the DTMF-ASCII converters can be dialed from any telephone, and a standard telephone call may be established. The DTMF-ASCII converters may, for example, answer after two rings.

In each embodiment of the present invention, the computer 103 runs the predetermined program and waits for incoming calls. The computer 103 accordingly can respond to a call by requesting an access code. The predetermined program in the computer 103 does not need to request a password, but the predetermined program can be set up to request a password. As illustratively shown in FIGS. 5 through 8, the predetermined program may provide input prompts and menus of options, in a video format, to be displayed to the caller on a computer monitor or display screen 310 coupled to the user terminal, as shown in FIG. 4. The predetermined program may also output, through an audio device 320 coupled to the user terminal, audio messages and menus in the format of input prompts and menus of options, respectively. The audio device 320 may include a telephone handset, as illustrated in FIGS. 1-3. Prerecorded messages and menus can be transmitted for output to the telephone handset. The audio device 320 may also include a voice synthesizer for outputting voice synthesized instructions to the caller to provide, in an audio format, input prompts and menus of options. The user terminal 300 may include a personal computer with an accompanying display screen 310. For example, with the predetermined program displaying the Main Menu, as shown in FIG. 5, the input of an option number of a 2 results in another menu being displayed, as shown in FIG. 8. In response to the menu shown in FIG. 8, an access code that is input to a Touch-Tone push button telephone can be any of the digits 1 to 6, with all other responses being rejected as invalid, and with the predetermined program instructing the caller on a rejection to input another response. The input of an access code of 2 connects a source and a destination, while the input of an access code of 5 disconnects a source from a destination.

For connections and disconnections, the computer 103, using the predetermined program and the instructions and/or menus, in a video and/or audio format, can request from a caller a first number for a source, and then can request from the caller a second number for the destination. The computer 103 can then respond to the caller, and hang up the line. The predetermined program then establishes contact with the matrix switch 110 and passes along the connection or disconnection information; the connection or disconnection information may, for example, be displayed graphically on a display screen of the computer 103. After the connection or disconnection is complete, the computer 103 transfers control back to the original predetermined program and waits for another call to come in.

As illustrated in FIG. 9, the present invention includes a method, using a data dial system, for routing signals within the data dial system, including the steps of running 400 a predetermined program; waiting 405 for an input; determining 410 if a caller inputs a first user signal or a second user signal on a Touch-Tone push button keypad from a Touch-Tone push button telephone; executing 420, in response to an input of a first user signal, a connection sequence; otherwise, executing 430, in response to an input of a second user signal, a disconnection sequence; generating 440, in response to the first user signal, a first dual-tone-multiple-frequency (DTMF) signal from the first user signal; converting 450, in response to the first DTMF signal, the first DTMF signal to a first ASCII signal; generating 460, in response to the first ASCII signal, a first control signal; connecting 470, in response to the first control signal, a first input of a first plurality of inputs of the matrix switch to at least one of a first plurality of outputs; connecting 480, in response to the first control signal, a first output of a second plurality of outputs of the matrix switch to at least one of the second plurality of inputs; and returning 490 to waiting 405 for the caller to input a first user signal or a second user signal.

The method further includes the steps of generating 540, in response to a second user signal, a second dual-tone-multiple-frequency (DTMF) signal from the second user signal; converting 550, in response to the second DTMF signal, the second DTMF signal to a second ASCII signal; generating 560, in response to the second ASCII signal, a second control signal; disconnecting 570, in response to the second control signal, the first input of the matrix switch from at least one of the first plurality of outputs; disconnecting 580, in response to the second control signal, the first output of the matrix switch to at least one of the second plurality of inputs; and returning 590 to waiting for the caller to input a first user signal or a second user signal.

In a preferred embodiment, the method includes the step of generating a direct current biasing level for operating one or more Touch-Tone push button telephones, using a dial tone generator 102 as illustrated in FIG. 1. The method may further include the steps of outputting video messages to a caller via a display screen 310 coupled to a user terminal 300, as shown in FIG. 4. In addition, the method may include outputting audio messages to a caller via an audio device 320 coupled to a user terminal 300, as shown in FIG. 4.

The method of the present invention also includes the step of routing a video signal from a source, through a matrix switch, to a destination. In addition, the method of the present invention may include routing an audio signal from a source, through the matrix switch, to a destination.

In an alternate embodiment, the method of the present invention, without generating a direct current biasing level, may include the steps of outputting video and audio messages to a caller by a display screen 310 and by an audio device 320, respectively, as shown in FIG. 4, with the display screen 310 and the audio device 320 coupled to at least one user terminal 300. As illustrated in FIGS. 2 and 3, the method further includes routing video and audio signals, through a plurality of matrix switches, to a destination, with the additional steps of amplifying the video signal before transmitting the video signal from one matrix switch to another.

One exemplary application of the invention implements the data dial system in a hospital, with the telephones throughout the hospital connected to the data dial system. Using the data dial system, a technician, for example, can route imagery signals from an imagery device such as a CAT scan or from stored computer memory to a conference room or to a specific monitor in the hospital. In this example, the technician enters a four digit access code, responds to a synthesized voice to enter a password, enters the password as a series of numbers or letters on the Touch-Tone push button keypad, and further responds to a prompt by entering an access code for the source of the imagery signal and by entering an access code for the destination for the imagery signal.

It will be apparent to those skilled in the art that various modifications can be made to the data dial system of the instant invention without departing from the scope or spirit of the invention, and it is intended that the present invention cover modifications and variations of the data dial system provided they come within the scope of the appended claims and their equivalents.

I claim:

1. A data dial system comprising:
a matrix switch having a first plurality of inputs, a first plurality of outputs, a second plurality of inputs and a second plurality of outputs, wherein a first input of the first plurality of inputs, responsive to a first control signal, connects to at least one of the first plurality of outputs, and a first output of the second plurality of outputs, responsive to the first control signal, connects to one of the second plurality of inputs, respectively, and wherein said matrix switch, responsive to a second control signal, disconnects the first input from the connected one of the first plurality of outputs, and disconnects the first output from the connected one of the second plurality of inputs, respectively;
a plurality of user terminals, with each of said plurality of user terminals operatively coupled to one of the first plurality of inputs and to one of the second plurality of outputs, respectively;
a plurality of "Touch-Tone" push button telephones, with each of said plurality of "Touch-Tone" push button telephones having a dual-tone-multiple-frequency (DTMF) keypad for generating DTMF signals;
a dial tone generator, coupled to each of said plurality of "Touch-Tone" push button telephones, for providing a direct current biasing level for operating each of said plurality of "Touch-Tone" push button telephones;
a DTMF-ASCII converter, operatively coupled to said dial tone generator and responsive to each DTMF signal, for converting each DTMF signal to an ASCII signal; and
a processor, operatively coupled to said matrix switch and to said DTMF-ASCII converter, responsive to a first ASCII signal, for generating the first control signal for connecting the first input to at least one of the first plurality of outputs and for connecting the first output to one of the second plurality of inputs, and responsive to a second ASCII signal, for generating the second control signal for disconnecting the first input and the first output.

2. A data dial system comprising:
a matrix switch having a first plurality of inputs, a first plurality of outputs, a second plurality of inputs and a second plurality of outputs, wherein a first input of the first plurality of inputs, responsive to a first control signal, connects to at least one of the first plurality of outputs, and a first output of the second plurality of outputs, responsive to the first control signal, connects to at least one of the second plurality of inputs, respectively, and wherein said matrix switch, responsive to a second control signal, disconnects the first input from the connected one of first plurality of outputs, and disconnects the first output from the connected one of the second plurality of inputs, respectively;
a user terminal, with said user terminal operatively coupled to one of the first plurality of inputs of said matrix switch and to one of the second plurality of outputs of said matrix switch;
a "Touch-Tone" push button telephone having a dual-tone-multiple-frequency (DTMF) keypad for generating DTMF signals;
a DTMF-ASCII converter, operatively coupled to said "Touch-Tone" push button telephone, responsive to each DTMF signal for converting each DTMF signal to an ASCII signal; and
a processor, operatively coupled to Said matrix switch and to said DTMF-ASCII converter, responsive to a first ASCII signal for generating the first control signal for connecting the first input to at least one of the first plurality of outputs and the first output to one of the second plurality of inputs of said matrix switch, and responsive to a second ASCII signal for generating the second control signal for disconnecting the first input and the first output of said matrix switch.

3. A data dial system comprising:
a plurality of matrix switches, each of said plurality of matrix switches having a first plurality of inputs, a first plurality of outputs, a second plurality of inputs and a second plurality of outputs, with a first input of the first plurality of inputs, responsive to a first control signal, connecting to at least one of the first plurality of outputs, and a first output of the second plurality of outputs, responsive to the first control signal, connecting to at least one of the second plurality of inputs, respectively, and with each of said plurality of matrix switches, responsive to a second control signal, disconnecting the first input from the connected one of first plurality of outputs, and disconnecting the first output from the connected one of the second plurality of inputs, respectively;
a plurality of user terminals, with each of said plurality of user terminals operatively coupled to one of the first plurality of inputs of said matrix switch and to one of the second plurality of outputs of said matrix switch;
a plurality of "Touch-Tone" push button telephones, each of said plurality of "Touch-Tone" push button telephones having a dual-tone-multiple-frequency (DTMF) keypad for generating DTMF signals;
a plurality of DTMF-ASCII converters, operatively coupled to said plurality of "Touch-Tone" push button telephones, responsive to each DTMF signal for converting each DTMF signal to a corresponding ASCII signal; and a plurality of processors, each of said plurality of processors operatively coupled to a respective one of said plurality of matrix switches and to a respective one of said plurality of DTMF-ASCII converters, responsive to a first ASCII signal for generating the first control signal, responsive to a second ASCII signal for generating the second control signal, for routing a communications channel through said plurality of matrix switches.

4. The data dial system as in claim 1, further comprising:

a plurality of coaxial cables for coupling each of said plurality of user terminals to at least one of the first plurality of inputs of said matrix switch and to at least one of the second plurality of outputs of said matrix switch.

5. The data dial system as in claim 4, further comprising:

at least one wall outlet, coupled to each of said plurality of "Touch-Tone" push button telephones, coupled to said plurality of coaxial cables, coupled to said dial tone generator, for connecting each of said plurality of "Touch-Tone" push button telephones to said plurality of coaxial cables, respectively, and to said dial tone generator.

6. The data dial system as in claim 5, wherein each of said plurality of user terminals includes a DS-1 codec.

7. The data dial system as in claim 5, wherein each of said plurality of user terminals includes a DS-3 codec.

8. The data dial system as in claim 7, wherein at least one of the plurality of user terminals includes a DS-1 codec.

9. The data dial system as in claim 5, further comprising:

at least one local area network (LAN) gateway, with each LAN gateway operatively coupled to a respective one of the first plurality of outputs of said matrix switch.

10. The data dial system as in claim 5, wherein said processor further includes at least one microprocessor for running a predetermined program and for generating the first control signal and for generating the second control signal.

11. The data dial system as in claim 10, further comprising:

display means, operatively coupled to each of said plurality of user terminals, for displaying images.

12. The data dial system as in claim 10, further comprising:

an audio device, operatively coupled to each of said plurality of user terminals, for outputting audio signals.

13. The data dial system as in claim 12, wherein said audio device further includes:

a voice synthesizer for outputting synthesized voice audio signals.

14. The data dial system as in claim 11, further comprising:

a combiner, coupled to the second plurality of outputs of said matrix switch, for combining a plurality of video signals as a combined signal and for outputting the combined signal; and wherein said display means is operatively coupled to said combiner and responsive to the combined signal for displaying the combined signal as a plurality of images.

15. The data dial system as in claim 11, wherein said predetermined program outputs, to a caller, at least one video message on said display means.

16. The data dial system as in claim 15, wherein said predetermined program outputs, to the caller, at least one video menu on said display means.

17. The data dial system as in claim 12, wherein said predetermined program outputs, to a caller, at least one audio message on said audio device of said user terminal.

18. The data dial system as in claim 17, wherein said predetermined program outputs, to the caller, at least one audio menu on said audio device.

19. The data dial system as in claim 2, further comprising:

a plurality of "Touch-Tone" push button telephones, each of said plurality of "Touch-Tone" push button telephones having a dual-tone-multiple-frequency (DTMF) keypad for generating DTMF signals; and a private switched telephone network (PSTN), operatively coupled to said plurality of "Touch-Tone" push button telephones.

20. The data dial system as in claim 19, further comprising:

a plurality of coaxial cables for coupling said user terminal to at least one of the first plurality of inputs of said matrix switch and to at least one of the second plurality of outputs of said matrix switch.

21. The data dial system as in claim 20, further comprising:

a plurality of dial tone generators for providing a direct current biasing level for operating said plurality of "Touch-Tone" push button telephones; and at least one wall outlet, coupled to a respective one of said plurality of "Touch-Tone" push button telephones, coupled to said plurality of coaxial cables, coupled to said plurality of dial tone generators, for connecting a respective one of said plurality of "Touch-Tone" push button telephones to said plurality of coaxial cables and to said plurality of dial tone generators.

22. The data dial system as in claim 21, wherein said user terminal includes a DS-1 codec.

23. The data dial system as in claim 21, wherein said user terminal includes a DS-3 codec.

24. The data dial system as in claim 23, further comprising:

a plurality of user terminals, with each user terminal operatively coupled to one of the first plurality of inputs of said matrix switch and to one of the second plurality of outputs of said matrix switch; and wherein at least one of the plurality of user terminals includes a DS-1 codec.

25. The data dial system as in claim 21, further comprising:

at least one local area network (LAN) gateway, with each LAN gateway operatively coupled to a respective one of the first plurality of outputs of said matrix switch.

26. The data dial system as in claim 21, wherein said processor further includes at least one microprocessor for running a predetermined program and for generating the first control signal and for generating the second control signal.

27. The data dial system as in claim 26, further comprising:
display means, operatively coupled to said user terminal, for displaying images.

28. The data dial system as in claim 26, further comprising:
an audio device, operatively coupled to said user terminal, for outputting audio signals.

29. The data dial system as in claim 28, wherein said audio device further includes:
a voice synthesizer for outputting synthesized voice audio signals.

30. The data dial system as in claim 27, further comprising:
a combiner, coupled to the second plurality of outputs of said matrix switch, for combining a plurality of video signals as a combined signal and for outputting the combined signal; and
wherein said display means is operatively coupled to said combiner and responsive to the combined signal for displaying the combined signal as a plurality of images.

31. The data dial system as in claim 27, wherein said predetermined program outputs, to a caller, at least one video message on said display means of said user terminal.

32. The data dial system as in claim 31, wherein said predetermined program outputs, to the caller, at least one video menu on said display means of said user terminal.

33. The data dial system as in claim 28, wherein said predetermined program outputs, to the caller, at least one audio message on said audio device of said user terminal.

34. The data dial system as in claim 33, wherein said predetermined program outputs, to the caller, at least one audio menu on said audio device of said user terminal.

35. The data dial system as in claim 19, further comprising:
a plurality of matrix switches, each of said plurality of matrix switches having a first plurality of inputs, a first plurality of outputs, a second plurality of inputs and a second plurality of outputs, wherein a first input of the first plurality of inputs, responsive to a first control signal, connects to at least one of the first plurality of outputs, and a first output of the second plurality of outputs, responsive to the first control signal, connects to at least one of the second plurality of inputs, respectively, and wherein each of said plurality of matrix switches, responsive to a second control signal, disconnects the first input from the connected one of first plurality of outputs, and disconnects the first output from the connected one of the second plurality of inputs, respectively; and
a plurality of trunk lines for coupling the first plurality of outputs of a first matrix switch to the second plurality of inputs of a second matrix switch, and for coupling the first plurality of outputs of the second matrix switch to the second plurality of inputs of the first matrix switch.

36. The data dial system as in claim 35, further comprising:
a plurality of amplifiers, coupled to said plurality of trunk lines, connected at the first plurality of outputs of the first matrix switch and connected at the first plurality of outputs of the second matrix switch.

37. The data dial system as in claim 36, wherein said plurality of amplifiers includes a plurality of line build out (LBO) cards.

38. The data dial system as in claim 3, further comprising:
a private switched telephone network (PSTN), operatively coupled to said plurality of "Touch-Tone" push button telephones.

39. The data dial system as in claim 38, further comprising:
a plurality of trunk lines for coupling the first plurality of outputs of a first matrix switch to the second plurality of inputs of a second matrix switch, and for coupling the first plurality of outputs of the second matrix switch to the second plurality of inputs of the first matrix switch.

40. The data dial system as in claim 39, further comprising:
a plurality of amplifiers, coupled to said plurality of trunk lines, connected at the first plurality of outputs of the first matrix switch and connected at the first plurality of outputs of the second matrix switch.

41. The data dial system as in claim 40, wherein said plurality of amplifiers includes a plurality of line build out (LBO) cards.

42. A data dial system comprising:
switching means having a first plurality of inputs, a first plurality of outputs, a second plurality of inputs and a second plurality of outputs, for connecting, in response to a first control signal, a first input of the first plurality of inputs to at least one of the first plurality of outputs and for connecting a first output of the second plurality of outputs to one of the second plurality of inputs, respectively, for disconnecting, in response to a second control signal, the first input from the connected one of first plurality of outputs, and for disconnecting the first output from the connected one of the second plurality of inputs, respectively;
output means, operatively coupled to one of the first plurality of inputs and to one of the second plurality of outputs, respectively, for outputting video messages and video menus to a caller;
push button means for generating dual-tone-multiple-frequency (DTMF) signals;
generating means, coupled to said push button means, for generating a direct current biasing level for operating said push button means;
converting means, operatively coupled to said generating means, for converting DTMF signals to ASCII signals; and
processing means, operatively coupled to said switching means and to said converting means, for generating the first control signal and the second control signal and for routing a communications channel through said switching means.

43. The data dial system as set forth in claim 42, further comprising:
means for connecting said push button means and said generating means through an outlet on a wall.

44. The data dial system as set forth in claim 43, wherein said processing means further includes:
means for running a predetermined program.

45. The data dial system as set forth in claim 44, wherein said output means outputs audio messages and audio menus to a caller.

46. The data dial system as set forth in claim 44, further comprising:
combining means for combining a plurality of video signals as a combined signal and for outputting the combined signal;
wherein said output means is operatively coupled to said combining means and responsive to the combined signal for displaying the combined signal as a plurality of images.

47. The data dial system as set forth in claim 44, further comprising:
network means for interconnecting said push button means.

48. The data dial system as set forth in claim 47, further comprising:
first coding and decoding means for coding and decoding signals in a DS-1 format.

49. The data dial system as set forth in claim 48, further comprising:
second coding and decoding means for coding and decoding signals in a DS-3 format.

50. The data dial system as set forth in claim 47, further comprising:
trunk means for interconnecting said switching means; and
amplifier means, coupled to said trunk means, for amplifying signals transmitted by said trunk means.

51. A method, using a data dial system, for routing signals comprising the steps of:
 a. waiting for a caller to input a user signal on a push button keypad from a "Touch-Tone" push button telephone;
 b. determining if the caller inputs a first user signal or a second user signal;
 c. generating, in response to the first user signal, a first dual-tone-multiple-frequency (DTMF) signal from the first user signal;
 d. converting, in response to the first DTMF signal, the first DTMF signal to a first ASCII signal;
 e. generating, in response to the first ASCII signal, a first control signal;
 f. connecting, in response to the first control signal, a first input of a first plurality of inputs of a matrix switch to at least one of a first plurality of outputs;
 g. connecting, in response to the first control signal, a first output of a second plurality of outputs of the matrix switch to at least one of a second plurality of inputs;
 h. generating, in response to the second user signal, a second dual-tone-multiple-frequency (DTMF) signal from the second user signal;
 i. converting, in response to the second DTMF signal, the second DTMF signal to a second ASCII signal;
 j. generating, in response to the second ASCII signal, a second control signal;
 k. disconnecting, in response to the second control signal, the first input of the matrix switch from at least one of the first plurality of outputs; and
 l. disconnecting, in response to the second control signal, the first output of the matrix switch from at least one of the second plurality of inputs.

52. The method as set forth in claim 51, further including, before step (b), the step of:
 m. generating a direct current biasing level for operating the "Touch-Tone" push button telephone.

53. The method as set forth in claim 52, further including, after step (m) and before step (b), the step of:
 n. outputting to the caller, through a user terminal, a video message on a display screen.

54. The method as set forth in claim 53, further including, after step (n) and before step (b), the step of:
 o. outputting to the caller, through the user terminal, an audio message by an audio device.

55. The method as set forth in claim 52, further including, after step (i) and before step (j), the step of:
 p. routing a video signal from a source, through the matrix switch, to a destination.

56. The method as set forth in claim 52, further including, after step (i) and before step (j), the step of:
 q. routing an audio signal from a source, through the matrix switch, to a destination.

57. The method as set forth in claim 52, further including, after step (m) and before step (b), the step of:
 n. outputting to the caller, through a user terminal, a video message on a display screen.

58. The method as set forth in claim 52, further including, after step (m) and before step (b), the step of:
 n. outputting to the caller, through a user terminal, an audio message by an audio device.

59. The method as set forth in claim 57, further including, after step (i) and before step (j), the step of:
 o. routing a video signal from a source, through a plurality of matrix switches, to a destination.

60. The method as set forth in claim 57, further including, after step (i) and before step (j), the step of:
 p. routing an audio signal from a source, through a plurality of matrix switches, to a destination.

61. The method as set forth in claim 59, further including, after step (o) and before step (j), the steps of:
 p. amplifying the video signal; and
 q. transmitting the video signal from first one of the plurality of matrix switches to a second one of the plurality of matrix switches.

* * * * *